P. PERSSON.
HOE.
APPLICATION FILED FEB. 21, 1920.

1,364,140.

Patented Jan. 4, 1921.

Inventor:
Paul Persson
By Chas. E. Bulkley
Attys.

UNITED STATES PATENT OFFICE.

PAUL PERSSON, OF CHICAGO, ILLINOIS.

HOE.

1,364,140.　　　　　Specification of Letters Patent.　　Patented Jan. 4, 1921.

Application filed February 21, 1920. Serial No. 360,299.

*To all whom it may concern:*

Be it known that I, PAUL PERSSON, a citizen of the United States of America, and resident of Chicago, Cook county, Illinois, have invented a certain new and useful Improvement in Hoes, of which the following is a specification.

My invention relates to improvements in hoes and has for its object the provision of a hoe which is particularly adapted for mixing mortar and other materials, and one which can be operated more easily and will mix the material more thoroughly and efficiently than the ordinary form of hoe heretofore employed. By my improved construction, I also obtain a hoe which can be operated easily and efficiently as a garden hoe.

These and other features and objects of my invention will be more readily understood by having reference to the accompanying drawings, in which I have illustrated one particular embodiment of my invention, and in which—

Figure 1:
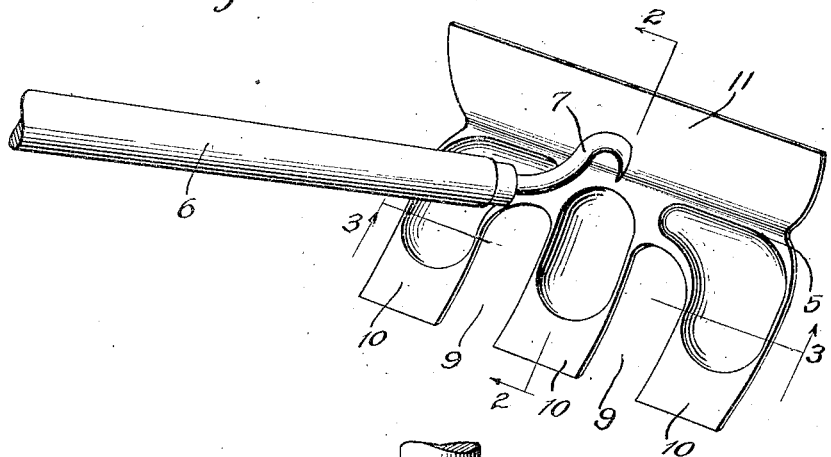
Figure 1 is a perspective view of my improved hoe.
Figure 2:
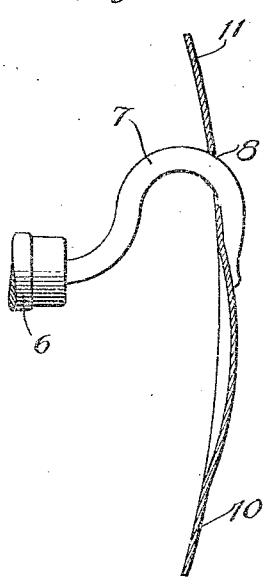
Fig. 2 is a sectional view taken on the line 2—2 of Fig. 1.
Figure 3:
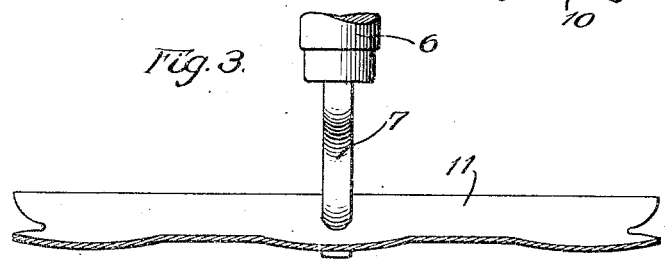
Fig. 3 is a sectional view taken on the line 3—3 of Fig. 1.
Figure 4:
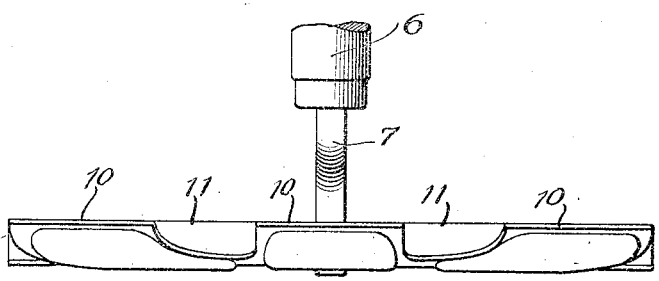
Fig. 4 is a plan view.

I have illustrated a hoe comprising a body portion 5, to which the handle 6 is secured, this handle being provided with a curved end 7 which projects through an opening 8 in the body portion 5 and is secured to the back thereof in any suitable manner. The body portion 5 is cut away, as indicated at 9, 9, thus forming a plurality of comparatively narrow downwardly projecting blades 10. The exact shape of the cutout portions 9 can, of course, be varied although I prefer that they extend through to the lower edge of the body portion 5, thus producing separate blades 10, rather than having these cut-out portions consist merely of openings in the body 5. Instead of being flat, the blades 10 are preferably dished or curved concavo-convex on a transverse section, the back of the blades being convex. This dishing or curving of the blades not only strengthens them, but also increases the efficiency and safety of the hoe when used for mixing materials. In this mixing operation, when the hoe is being pushed backwardly through the mixture, the convex form of the blades tends to decrease the air pressure at the back of the blades as the curvature of the blades permits the air to escape around the edges of the blades. This not only makes the hoe easier to operate, but prevents the air being confined back of the blade under sufficient pressure to cause the material to be squirted through the openings, which might be quite dangerous in the mixing of certain materials. Furthermore, by the use of my improved hoe, I obtain a much more efficient mixing as the plurality of comparatively narrow spaced-apart blades, being drawn back and forth through the mixture, tends to mix the same much more thoroughly than where a single blade is employed. Likewise, this structure with the plurality of spaced blades makes a very efficient hoe for ordinary garden usage.

In order to provide the hoe with a wide flat blade having a straight edge so that the hoe can be used for scraping the bottom of the mixing trough or board, I extend the body portion upward at a slightly forwardly inclined angle to form a flat wide blade 11. This blade is also of sufficient strength to enable it to be used effectively for chopping roots or weeds when the hoe is being used for gardening purposes. It will, of course, be understood that this single scraping or cutting blade can be omitted, if desired.

It will thus be seen that I have devised a very efficient hoe both for mixing materials or for garden use, and while I have illustrated a certain specific embodiment of my invention, it will, of course, be understood that I do not wish to be limited to the exact construction shown and described, as various changes and modifications can be made without departing from the spirit and intent of my invention, thus the size and shape of the cut-out portions of the blade can be varied, as well as the number of these portions, thus varying the number and the size of the blades. Other changes will readily suggest themselves to those skilled in the art.

What I claim as my invention is:—

A hoe comprising a body member, the front of said body member being concave on a vertical section, a handle terminating in a curved shank, the end of said shank passing through an opening in said body member and being secured to the rear thereof, the upper portion of said body member extending above said shank and terminating in a straight continuous cutting edge, the lower portion of said body member having sections thereof cut away to thereby form a plurality of spaced apart hoeing or mixing blades, each of said blades having their upper portion curved concavo-convex on a transverse section, and the lower edge of said blades terminating in a straight edge.

Signed by me at Chicago, Illinois, this 17 day of February, 1920.

PAUL PERSSON.